US009596435B2

(12) United States Patent
Nagahara et al.

(10) Patent No.: US 9,596,435 B2
(45) Date of Patent: Mar. 14, 2017

(54) DISTRIBUTION CONTROL APPARATUS, DISTRIBUTION CONTROL METHOD, AND COMPUTER PROGRAM PRODUCT

(71) Applicants: Takanori Nagahara, Tokyo (JP); Kiyoshi Kasatani, Kanagawa (JP); Norihiko Murata, Tokyo (JP)

(72) Inventors: Takanori Nagahara, Tokyo (JP); Kiyoshi Kasatani, Kanagawa (JP); Norihiko Murata, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/009,229

(22) Filed: Jan. 28, 2016

(65) Prior Publication Data

US 2016/0227170 A1    Aug. 4, 2016

(30) Foreign Application Priority Data

Feb. 2, 2015    (JP) .................. 2015-018580

(51) Int. Cl.
*H04N 7/01* (2006.01)
*H04N 7/15* (2006.01)
(Continued)

(52) U.S. Cl.
CPC .............. *H04N 7/155* (2013.01); *G06F 3/01* (2013.01); *H04M 3/567* (2013.01); *H04N 7/152* (2013.01);
(Continued)

(58) Field of Classification Search
USPC ...... 348/14.03, 43, 130, 211.6, 425.3, 426.1, 348/432.1, 441, 467, 469, E7.081, E7.071
See application file for complete search history.

(56) References Cited

U.S. PATENT DOCUMENTS 8,806,354 B1   8/2014 Hyndman et al.
9,035,896 B2   5/2015 Nagahara
(Continued)

FOREIGN PATENT DOCUMENTS

JP   2006-31359 A   2/2006
JP   5451397        1/2014
JP   2014-200074    10/2014

OTHER PUBLICATIONS

U.S. Appl. No. 14/674,422, filed Mar. 31, 2015.
Extended European Search Report issued on Jun. 23, 2016 in Patent Application No. 16153260.1.

*Primary Examiner* — Yosef K Laekemariam
(74) *Attorney, Agent, or Firm* — Oblon, McClelland, Maier & Neustadt, L.L.P.

(57) ABSTRACT

A distribution control apparatus is connected to a communication terminal via a network. The distribution control apparatus includes a receiving unit, a whiteboard control unit, a whiteboard unit, and a transmitting unit. The receiving unit receives, from the communication terminal, operation data representing an operation performed by a user. When the operation is a stroke command, the whiteboard control unit stores a series of coordinates entered onto the communication terminal and contained in the operation data in a first storage unit and generates stroke data representing a stroke from the stored coordinates. The whiteboard unit stores the generated stroke data in a second storage unit and generates video data by rendering the stroke data. The transmitting unit transmits, to the communication terminal, converted video data that is obtained by converting the generated video data into a data format that allows distribution.

7 Claims, 13 Drawing Sheets

(51) Int. Cl.
*G06F 3/01* (2006.01)
*H04M 3/56* (2006.01)
*H04N 21/41* (2011.01)
*H04N 21/422* (2011.01)
*H04N 21/4788* (2011.01)

(52) U.S. Cl.
CPC ... *H04N 21/4122* (2013.01); *H04N 21/42224* (2013.01); *H04N 21/4788* (2013.01)

(56) References Cited

U.S. PATENT DOCUMENTS

| | | | |
|---|---|---|---|
| 2003/0058227 A1* | 3/2003 | Hara | G06F 3/04883 345/178 |
| 2004/0140964 A1* | 7/2004 | Wang | G06F 3/03545 345/179 |
| 2006/0092178 A1 | 5/2006 | Tanguay, Jr. et al. | |
| 2007/0216660 A1 | 9/2007 | Sposato et al. | |
| 2007/0222747 A1 | 9/2007 | Kritt et al. | |
| 2008/0104652 A1* | 5/2008 | Swenson | H04L 47/10 725/118 |
| 2012/0229425 A1 | 9/2012 | Barrus et al. | |
| 2012/0233553 A1 | 9/2012 | Barrus | |
| 2015/0035782 A1 | 2/2015 | Kawasaki et al. | |
| 2015/0070325 A1 | 3/2015 | Nagahara | |
| 2015/0077369 A1 | 3/2015 | Nagahara et al. | |

\* cited by examiner

FIG.14

| TRANSMIS-SION ID | COLOR | THICK-NESS | COORDI-NATE 1 | COORDI-NATE 2 | COORDI-NATE 3 | ... |
|---|---|---|---|---|---|---|
| A1 | BLACK | 3pt | X1, Y1 | X2, Y2 | ... | ... |
| B1 | RED | 1pt | 10, 10 | ... | ... | ... |

DISTRIBUTION CONTROL APPARATUS, DISTRIBUTION CONTROL METHOD, AND COMPUTER PROGRAM PRODUCT

CROSS-REFERENCE TO RELATED APPLICATIONS

The present application claims priority to and incorporates by reference the entire contents of Japanese Patent Application No. 2015-018580 filed in Japan on Feb. 2, 2015.

BACKGROUND OF THE INVENTION

1. Field of the Invention

The present invention relates generally to a distribution control apparatus, a distribution control method, and a computer program product.

2. Description of the Related Art

With the recent widespread use of the Internet, cloud computing has been used in various fields. Cloud computing is a service utilization pattern in which a user uses a service (i.e., a cloud service) provided by a server on the Internet using a communication terminal connected to the Internet and pays for the service.

A video-data distribution service is typically provided by distributing, to a communication terminal, converted video data obtained by converting video data into a data format that allows distribution using a video compression technique. An architecture making use of such a technique as described above to distribute a video content through remote interaction, for example, is disclosed in Japanese Patent No. 5451397. This architecture interactively distributes consecutive video frames to a device.

However, the conventional technique is disadvantageous in that, when user's operation entered (hereinafter, "user's operation input") by handwriting to a communication terminal, to which a video is interactively distributed, is accepted during a conference, the user's operation input cannot be viewed after the conference is closed.

Therefore, there is a need for a distribution control apparatus, a distribution control method, and a computer program product for increasing convenience by displaying an operation input even after a video distribution is completed.

SUMMARY OF THE INVENTION

It is an object of the present invention to at least partially solve the problems in the conventional technology.

A distribution control apparatus is connected to a communication terminal via a network. The distribution control apparatus includes a receiving unit, a whiteboard control unit, a whiteboard unit, and a transmitting unit. The receiving unit receives, from the communication terminal, operation data representing an operation performed by a user. When the operation is a stroke command, the whiteboard control unit stores a series of coordinates entered onto the communication terminal and contained in the operation data in a first storage unit and generates stroke data representing a stroke from the stored coordinates. The whiteboard unit stores the generated stroke data in a second storage unit and generates video data by rendering the stroke data. The transmitting unit transmits, to the communication terminal, converted video data obtained by converting the generated video data into a data format that allows distribution.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 14 is a diagram illustrating an example of stroke meta information.

DETAILED DESCRIPTION OF THE PREFERRED EMBODIMENTS

Embodiments are described in detail below with reference to the accompanying drawings. The term "image" used herein covers still images and moving images. The term "video" used herein basically denotes moving images and also covers moving images that are paused to be still images. The term "still image (audio)" is used to denote at least one of a still image and audio. The term "image (audio)" is used to denote at least one of an image and audio. The term "video (audio)" is used to denote at least one of a video and audio.

System Configuration

Figure 1:
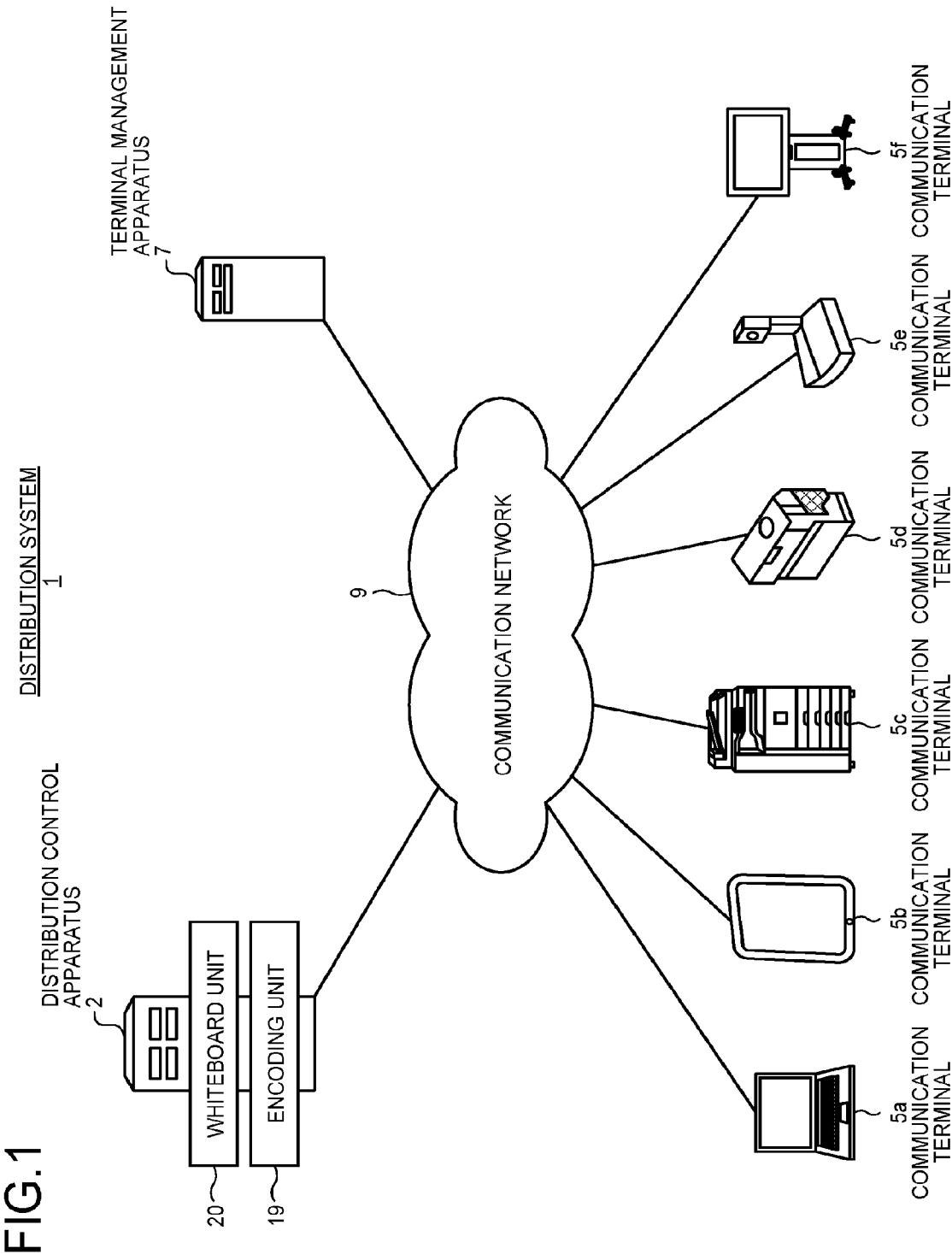
FIG. 1 is a schematic diagram of a distribution system according to an embodiment.

A configuration of a distribution system 1 is described below. FIG. 1 is a schematic diagram of a distribution system according to an embodiment.

As illustrated in FIG. 1, the distribution system 1 according to the present embodiment includes a distribution control apparatus 2, a plurality of communication terminals 5a to 5f, and a terminal management apparatus 7. The term "communication terminal 5" is used herein to denote an arbitrary one of the communication terminals 5a to 5f. Each of the distribution control apparatus 2 and the terminal management apparatus 7 is implemented by a server computer.

The communication terminals 5 are terminals used by users receiving a service(s) provided by the distribution system 1. The communication terminal 5a, which is one of the communication terminals 5, is a notebook personal computer (PC). The communication terminal 5b is a mobile terminal such as a smartphone or a tablet terminal. The communication terminal 5c is an multifunction peripheral/printer/product (MFP), in which functions of copying, scanning, printing, and facsimile are combined. The communication terminal 5d is a projector. The communication terminal 5e is a television (video) conference terminal including a camera, a microphone, and a loudspeaker (hereinafter, "speaker"). The communication terminal 5f is an electronic whiteboard capable of electronically converting an object(s) drawn/written thereon by a user or the like.

The communication terminal 5 is not limited to such terminals as those illustrated in FIG. 1. The communication terminal 5 may be other device, such as a watch, a vending machine, a gas meter, a car navigation device, a video game console, an air conditioner, a lighting fixture, an independent camera, an independent microphone, or an independent speaker, each capable of communication over a communication network such as the Internet.

The distribution control apparatus 2, the communication terminals 5, and the terminal management apparatus 7 can communicate with each other via a communication network 9, which may be the Internet, a local area network (LAN) and/or the like. Examples of the communication network 9 further include wireless communication networks such as a third generation (3G) network, a worldwide interoperability for microwave access (WiMAX), and a long term evolution (LTE).

Some of the communication terminal 5 may not have the function of communicating with another terminal or another system via the communication network 9 as in the case of the communication terminal 5d, for example. However, a user inserts a dongle into an interface, such as a universal serial bus (USB) or a high-definition multimedia interface (HDMI) (registered trademark), of the communication terminal 5d, thereby enabling it to communicate with the other terminals and systems.

The distribution control apparatus 2 includes an interactive whiteboard unit 20. The whiteboard unit 20 has a renderer function of acquiring a single piece or a plurality pieces of content data described in a predetermined description language and performing rendering. Thus, the renderer function allows the whiteboard unit 20 to generate frame data as still image data such as bitmap data made up of red, green, and blue (RGB) and audio data such aspulse code modulation (PCM) data (i.e., still image (audio) data). The content data is data acquired from a desired communication terminal or the like and can include image (audio) data in hypertext markup language (HTML) and cascading style sheets (CSS), image (audio) data in MP4 (MPEG-4), and audio data in advanced audio coding (AAC).

The distribution control apparatus 2 further includes an encoding unit 19. The encoding unit 19 performs its function as an encoder, thereby converting frame data as still image (audio) data, into video (audio) data in a compression coding format such as H.264 (MPEG-4 AVC), H.265, and Motion JPEG.

The terminal management apparatus 7 performs login authentication, management of contract information, and the like of the communication terminals 5. The terminal management apparatus 7 further has a function as a simple mail transfer protocol (SMTP) server for transmitting electronic mails. The terminal management apparatus 7 can be implemented as a virtual machine running on a cloud service (IaaS: infrastructure as a service), for example. It is desirable to operate the terminal management apparatus 7 in a multiplexed manner so that the service is provided uninterruptedly in case of unexpected incidents.

The whiteboard unit 20 enables real-time communication/collaboration (RTC). The distribution control apparatus 2 includes the encoding unit 19 illustrated in FIG. 9, which is referred to later. The encoding unit 19 can perform real-time encoding on the frame data output from the whiteboard unit 20 to thereby output video (audio) data generated through conversion compliant with the H.264 standard or the like. Accordingly, processing performed by the distribution control apparatus 2 differs from processing performed when non real-time video (audio) data recorded in a DVD is read and distributed by a DVD player.

Meanwhile, not only the distribution control apparatus 2 but also the communication terminal 5 may include an interactive whiteboard unit. In this case, the need for starting up the whiteboard unit of each of the communication terminals 5 can be eliminated by updating the whiteboard unit 20 of the distribution control apparatus 2.

Various Distribution Methods

Various distribution methods are described below.

Basic Distribution

Figure 2:
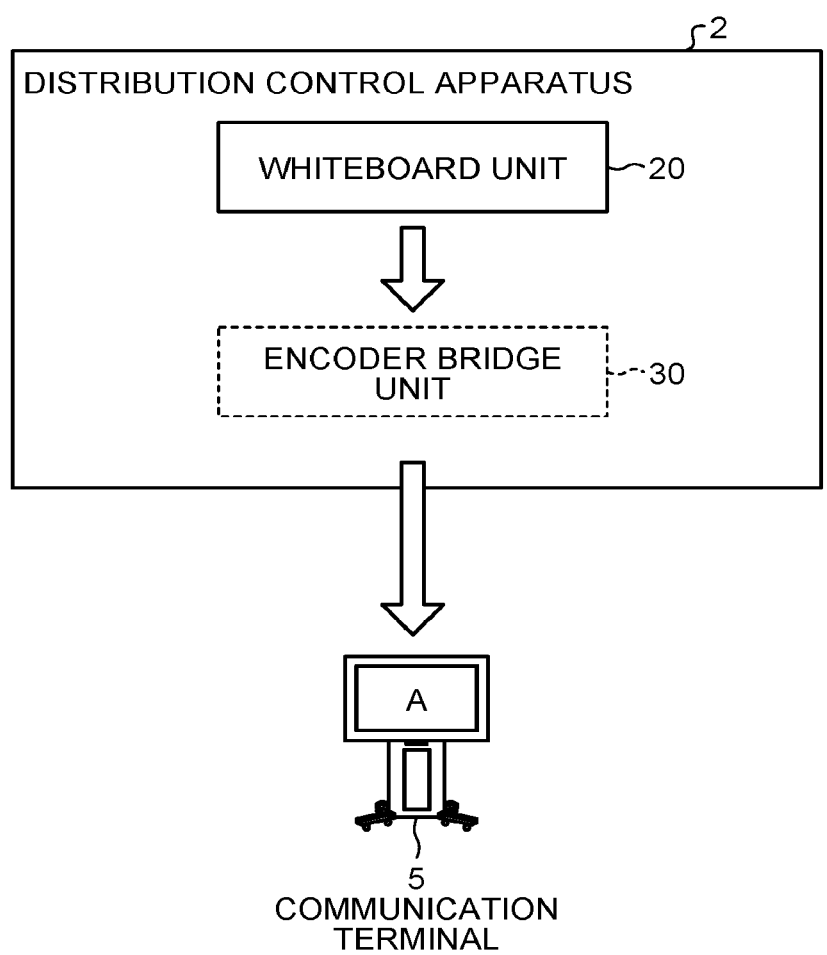
FIG. 2 is a conceptual diagram illustrating a basic distribution method.

FIG. 2 is a conceptual diagram illustrating a basic distribution method. As illustrated in FIG. 2, in the distribution system 1, the whiteboard unit 20 of the distribution control apparatus 2 acquires content data A as image (audio) data from a desired communication terminal or the like and renders the content data A, thereby generating pieces of frame data A as still image (audio) data. An encoder bridge unit 30 including the encoding unit 19 performs encoding and the like on the pieces of frame data A, thereby converting them into video (audio) data A (which is an example of "converted video data") in a compression coding format such as H.264. The distribution control apparatus 2 distributes the video (audio) data A thus converted to the communication terminal 5.

Furthermore, the distribution system 1 can distribute content data, which is video (audio) data, to a plurality of sites by making use of the distribution method described above. A method for distributing content data to a plurality of sites is described below with reference to FIGS. 3 to 5.

Multicast

Figure 3:
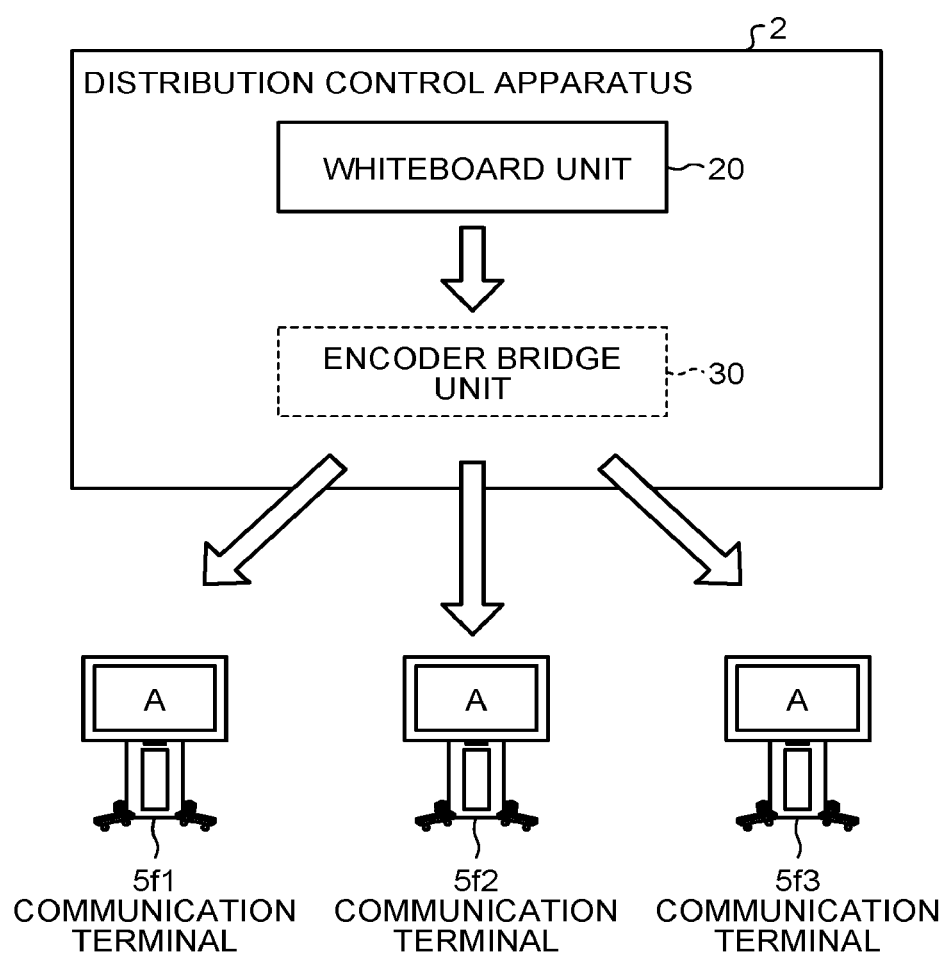
FIG. 3 is a conceptual diagram of multicast.

FIG. 3 is a conceptual diagram of multicast. Referring to FIG. 3, the whiteboard unit 20 of the distribution control apparatus 2 acquires the content data A, which is image (audio) data, from a desired communication terminal or the like and renders the content data A, thereby generating pieces of frame data A as still image (audio) data. The encoder bridge unit 30 encodes the pieces of frame data A, thereby converting them into video (audio) data. Thereafter, the distribution control apparatus 2 distributes the video (audio) data A (an example of "converted video data") to a plurality of communication terminals 5/1, 5/2, and 5/3.

By the method described above, same video (audio) is played back at the plurality of sites. In this case, it is not required that the communication terminals 5/1, 5/2, and 5/3 should have a same level of display/playback capability (e.g., a same resolution). Such a distribution method as described above is referred to as "multicast", for example.

Multi-Display

Figure 4:
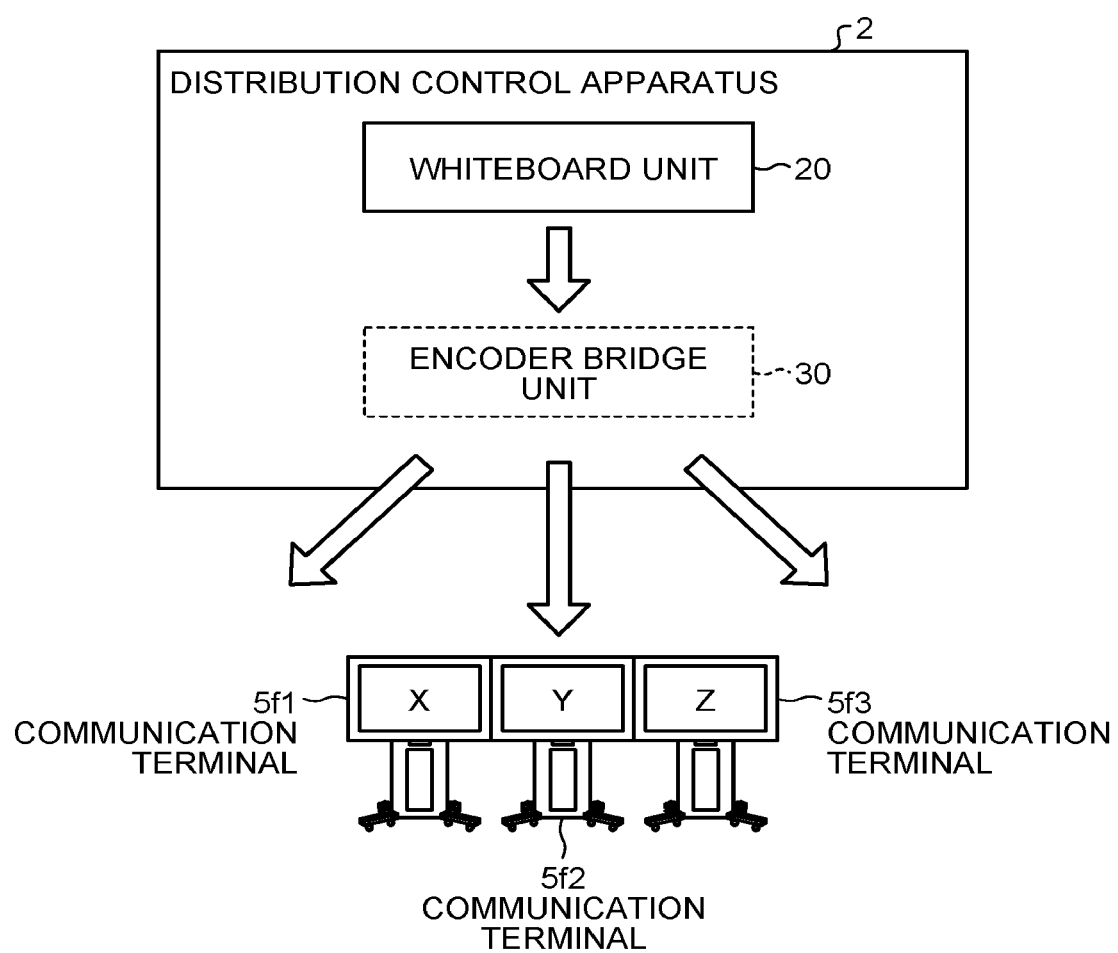
FIG. 4 is a conceptual diagram of multi-display.

FIG. 4 is a conceptual diagram of multi-display. Referring to FIG. 4, the whiteboard unit 20 of the distribution control apparatus 2 acquires content data XYZ as image (audio) data from a desired communication terminal or the like and renders the content data XYZ, thereby generating pieces of frame data XYZ as still image (audio) data. The encoder bridge unit 30 divides each frame data XYZ into a plurality of pieces of frame data X, Y, and Z, and encodes the frame data X, Y, and Z, thereby converting them into a plurality of pieces of video (audio) data X, Y, and Z. Thereafter, the distribution control apparatus 2 distributes the video (audio) data X (an example of "converted video data") to the communication terminal 5/1. Similarly, the distribution control apparatus 2 distributes the video (audio) data Y (an example of "converted video data") to the communication terminal 5/2 and distributes the video (audio) data Z (an example of "converted video data") to the communication terminal 5/3.

As described above, even for landscape content XYZ, video (audio) of the content XYZ is played back by the plurality of communication terminals 5 in a divided manner. Accordingly, when the communication terminals 5/1, 5/2, and 5/3 are arranged in a row, an effect similar to that obtained when a single video of a large size is played back can be obtained. To obtain the effect, it is required that the communication terminals 5/1, 5/2, and 5/3 are identical in display/playback capability (e.g., identical in resolution). Such a distribution method as described above is referred to as "multi-display", for example.

Composite Distribution

Figure 5:
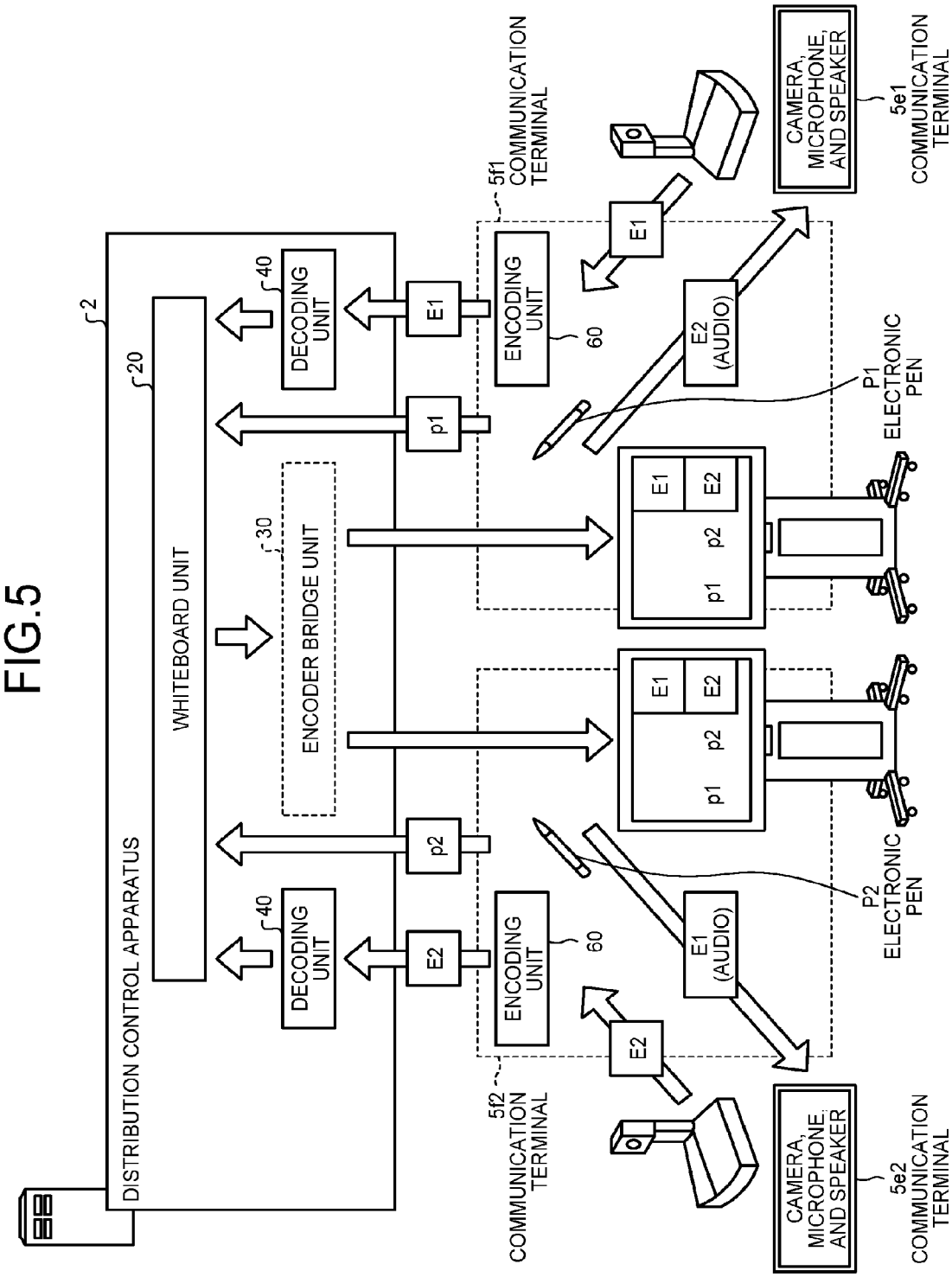
FIG. 5 is a conceptual diagram of composite distribution via a distribution control apparatus using a plurality of communication terminals.

FIG. 5 is a conceptual diagram of composite distribution via the distribution control apparatus 2 using a plurality of communication terminals. As illustrated in FIG. 5, the communication terminal 5/1, which is an electronic whiteboard, and a communication terminal 5e1, which is a video conference terminal, are used at a first site (which is on the right side in FIG. 5), whereas the communication terminal 5/2, which is an electronic whiteboard, and a communication terminal 5e2, which is a video conference terminal, are used at a second site (which is on the left side in FIG. 5). An electronic pen P1 for writing/drawing a character and the like with a stroke(s) on the communication terminal 5/1 is used at the first site. An electronic pen P2 for writing/drawing a character and the like with a stroke(s) on the communication terminal 5/2 is used at the second site.

At the first site, video (audio) data acquired by the communication terminal 5e1 is encoded by an encoding unit 60. Thereafter, the encoded data is transmitted to the distribution control apparatus 2. Thereafter, the encoded data is decoded by a decoding unit 40 of the distribution control apparatus 2 and fed to the whiteboard unit 20. Operation data representing a stroke(s) drawn on the communication terminal 5/1 with the electronic pen P1 is transmitted to the distribution control apparatus 2 and fed to the whiteboard unit 20. In this case, the operation data is coordinate data of the stroke(s) on a display of the communication terminal 5/1 or the like.

Also at the second site, video (audio) data acquired by the communication terminal 5e2 is encoded by the encoding unit 60. Thereafter, the encoded data is transmitted to the distribution control apparatus 2. Thereafter, the encoded data is decoded by the decoding unit 40 of the distribution control apparatus 2 and fed to the whiteboard unit 20. Operation data representing a stroke(s) drawn on the communication terminal 5/2 with the electronic pen P2 is transmitted to the distribution control apparatus 2 and fed to the whiteboard unit 20. In this case, the operation data is coordinate data of the stroke(s) on a display of the communication terminal 5/2 or the like.

The whiteboard unit 20 acquires, for example, the content data A representing a background image to be displayed on the display of each of the communication terminals 5/1 and 5/2 from a desired communication terminal or the like. The whiteboard unit 20 combines the content data A, operation data p1 and p2, and video (audio) content data E1 and E2 and renders them, thereby generating pieces of frame data as still image (audio) data in which the pieces of content data A, p1, p2, E1, and E2 are arranged in a desired layout. The encoder bridge unit 30 encodes the pieces of frame data. The distribution control apparatus 2 distributes video (audio) data (an example of "converted video data") representing the same content (A, p1, p2, E1, and E2) to both sites.

As a result, at the first site, a video (A, p1, p2, E1 (video part), and E2 (video part)) is displayed on the display of the communication terminal 5/1, and audio E2 (audio part) is output from a speaker of the communication terminal 5e1. At the second site, the video (A, p1, p2, E1 (video part), and E2 (video part)) is displayed on the display of the communication terminal 5/2, and audio E1 (audio part) is output from a speaker of the communication terminal 5e2.

At the first site, the audio of the site itself E1 (audio part) is not output owing to an echo cancelling function of the communication terminal 5/1. At the second site, the audio of the site itself E2 (audio part) is not output owing to an echo cancelling function of the communication terminal 5/2.

As described above, the distribution system 1 according to the present embodiment can perform remote sharing processing of sharing the same information in real time at remote sites, which are the first site and the second site, and therefore is effective for teleconference and the like.

Hardware Structures

Figure 6:
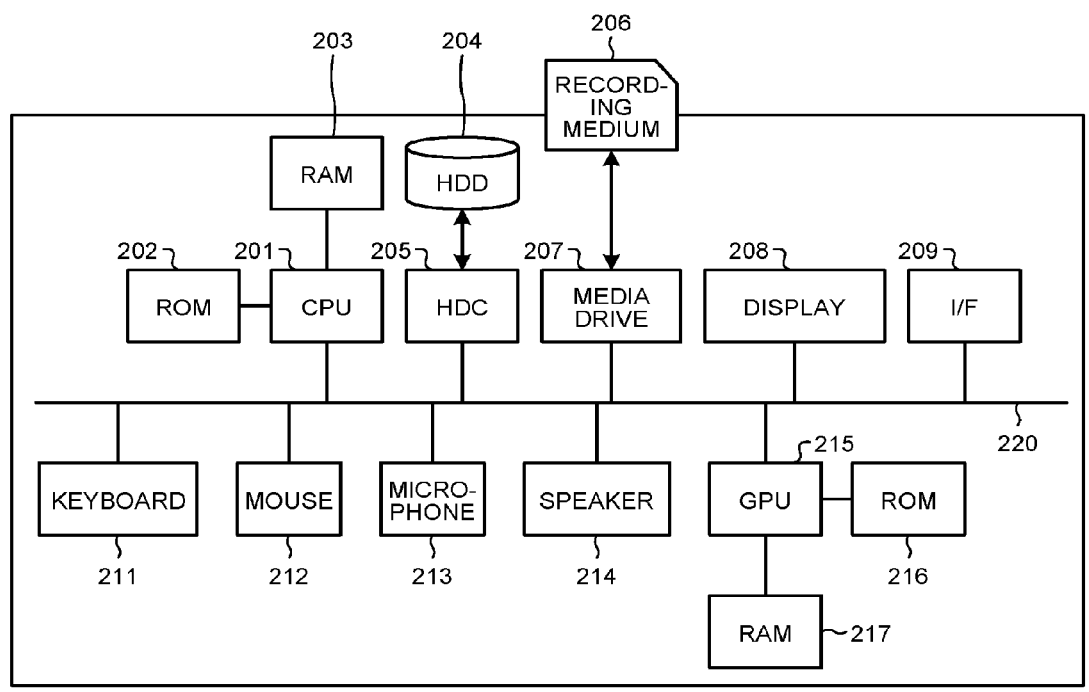
FIG. 6 is a hardware structure diagram of the distribution control apparatus and a terminal management apparatus according to the embodiment.

Hardware structures of the apparatuses according to the present embodiment are described below. FIG. 6 is a hardware structure diagram of the distribution control apparatus and the terminal management apparatus according to the embodiment.

The distribution control apparatus 2 is described below. As illustrated in FIG. 6, the distribution control apparatus 2 includes a CPU (central processing unit) 201, a ROM (read only memory) 202, a RAM (random access memory) 203, an HDD (hard disk drive) 204, an HDC (hard disk controller) 205, a media drive 207, a display 208, an I/F 209, a keyboard 211, a mouse 212, a microphone 213, a speaker 214, a GPU (graphics processing unit) 215, a ROM 216, a RAM 217, and an expansion bus line 220. The CPU 201 controls operations of the entire distribution control apparatus 2. The ROM 202 stores therein program instructions, such as an IPL (initial program loader), for use in driving the CPU 201. The RAM 203 is used as a work area of the CPU 201. The HDD 204 stores therein various data such as program instructions. The HDC 205 controls reading and writing of the various data from and to the HDD 204 under control of the CPU 201. The media drive 207 controls reading and writing of data from and to a recording medium 206 such as a flash memory. The display 208 displays various information. The I/F 209 is used to transmit data using the communication network 9 or receive connection of a dongle. The ROM 216 stores therein program instructions for use in driving the GPU 215. The RAM 217 is used as a work area of the GPU 215. The expansion bus line 220, such as an address bus or a data bus, provides electrical connection between the above-described components as illustrated in FIG. 6. The hardware structure may be configured without a GPU as in the case of the communication terminal 5d, which is a projector. The terminal management apparatus 7 is similar in hardware structure to the distribution control apparatus 2, and repeated description is omitted.

Functional Components

Functional components of the apparatuses and the terminals according to the present embodiment are described below with reference to FIG. 7 to FIG. 10.

Functional Configuration of Distribution Control Apparatus

Figure 7:
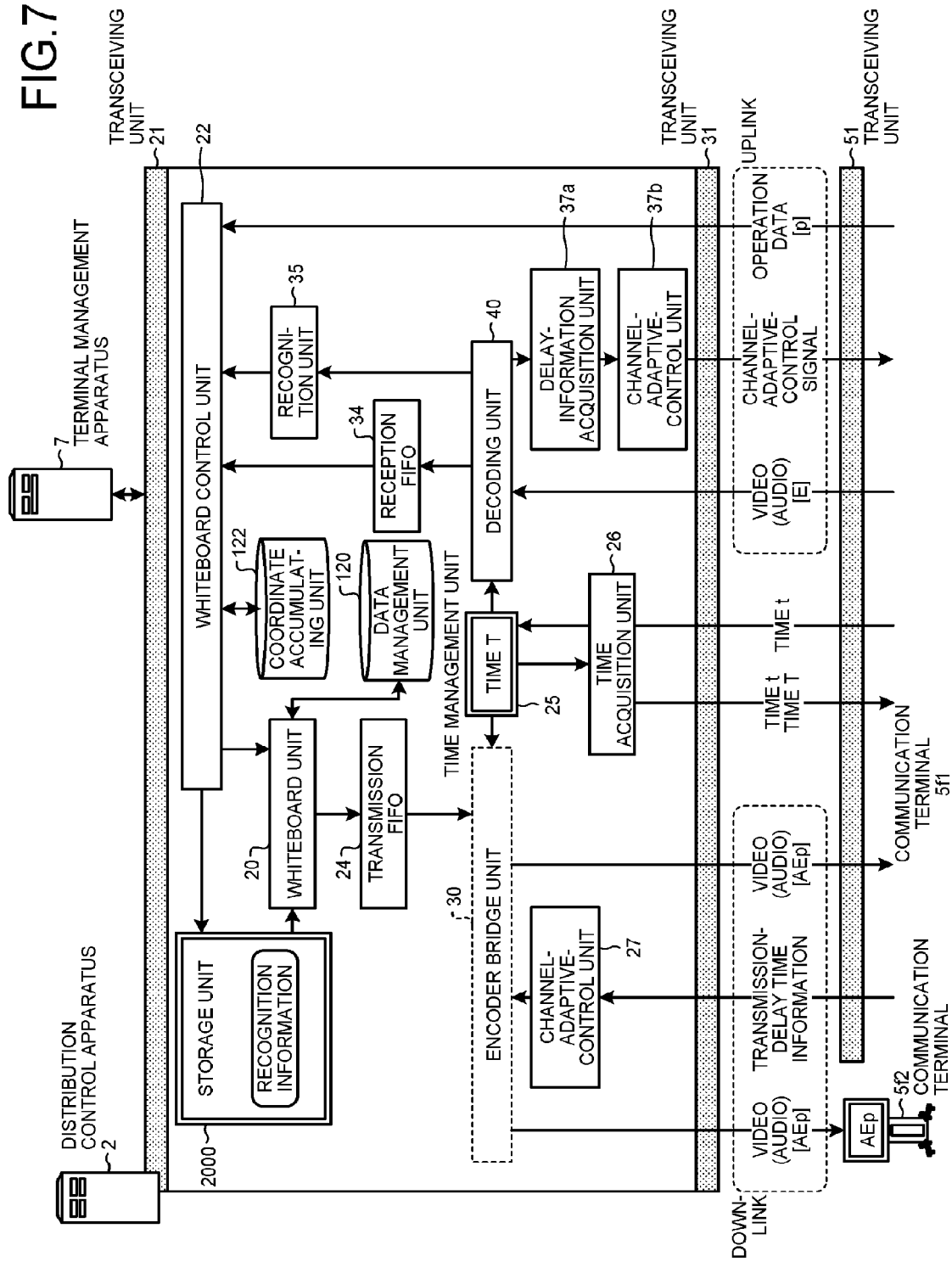
FIG. 7 is a functional block diagram illustrating functions of the distribution control apparatus according to the embodiment.

The functional configuration of the distribution control apparatus 2 are described below with reference to FIG. 7. FIG. 7 is a functional block diagram illustrating functions of the distribution control apparatus according to the embodiment. FIG. 7 illustrates a functional configuration of the distribution control apparatus 2 where the distribution control apparatus 2 distributes video (audio) data is distributed to the communication terminal 5/1, and the distribution control apparatus 2 has the same functional configuration also where the distribution destination is other than the communication terminal 5/1. Although the distribution control apparatus 2 includes a plurality of distribution engine servers, the following describes a case where the distribution control apparatus 2 includes a single distribution engine server in order to simplify the description.

As illustrated in FIG. 7, the distribution control apparatus 2 has the functional components illustrated in FIG. 7 implemented by the hardware components such as a processor, which is the CPU 201 or the GPU 215, illustrated in FIG. 6 and program instructions.

More specifically, the distribution control apparatus 2 includes the whiteboard unit 20, a transceiving unit 21, an interactive-whiteboard control unit 22, a transmission FIFO (first-in first-out) 24, a time management unit 25, a time acquisition unit 26, a channel-adaptive-control unit 27, the encoder bridge unit 30, a transceiving unit 31, a reception FIFO 34, a recognition unit 35, a delay-information acquisition unit 37a, a channel-adaptive-control unit 37b, and the decoding unit 40.

The distribution control apparatus 2 further includes a storage unit 2000, a coordinate accumulating unit 122, and a data management unit 120 implemented by the HDD 204 illustrated in FIG. 6. The storage unit 2000 stores therein recognition information, which is described later, output and transmitted from the recognition unit 35 via the whiteboard control unit 22. Content data acquired by the whiteboard unit 20 can be temporarily stored in the storage unit 2000 as a cache. The coordinate accumulating unit 122 stores therein a series of coordinates entered onto the communication terminal 5. The data management unit 120 stores therein stroke data representing a stroke(s) generated from the coordinates.

The transceiving unit 21 transmits and receives various data, various requests, various commands, and the like to and from the terminal management apparatus 7 and a desired communication terminal. For example, the transceiving unit 21 acquires content data from a desired communication terminal. Furthermore, the transceiving unit 21 outputs various data acquired from the terminal management apparatus 7 to the functional components in the distribution control apparatus 2 and controls the functional components in the distribution control apparatus 2 based on various data, various requests, various commands, or the like acquired from the terminal management apparatus 7. For example, the transceiving unit 21 performs switching of combinations of the components within the encoder bridge unit 30 illustrated in FIG. 8 based on the request for switching distribution from the terminal management apparatus 7.

The whiteboard control unit 22 controls the whiteboard unit 20. More specifically, the whiteboard control unit 22 acquires various operation data representing an operation performed by a user from the communication terminal 5 via the transceiving unit 31 and outputs the operation data to the whiteboard unit 20. The operation data is data generated through operation events (operations through the keyboard 211, the mouse 212, and the like, a stroke(s) with an electronic pen P and the like) on the communication terminal 5. If the operation performed by a user is a stroke command, the whiteboard control unit 22 stores a series of coordinates entered onto the display of the communication terminal 5 and contained in the operation data in the coordinate accumulating unit 122. The whiteboard control unit 22 generates stroke data representing a stroke(s) drawn by the user's operation from all the coordinates stored and accumulated in the coordinate accumulating unit 122 and outputs the stroke data to the whiteboard unit 20.

If the operation performed by a user is a page command (command to add a page), the whiteboard control unit 22 outputs the added page to the whiteboard unit 20. If the operation performed by a user is an image command (command to add an image), the whiteboard control unit 22 outputs the added image to the whiteboard unit 20. If the operation performed by the user is none of these commands, the whiteboard control unit 22 outputs the user's operation as a mouse event to the whiteboard unit 20.

If the communication terminal 5 includes various sensors such as a temperature sensor, a humidity sensor, and an acceleration sensor, the whiteboard control unit 22 acquires sensor information that contains output signals of the sensors from the communication terminal 5 and outputs the sensor information to the whiteboard unit 20. Furthermore, the whiteboard control unit 22 acquires image (audio) data from the recognition unit 35 and outputs the image (audio) data to the whiteboard unit 20, and acquires recognition information described later from the recognition unit 35 and stores the recognition information in the storage unit 2000. The whiteboard control unit 22 also acquires image (audio) data from the reception FIFO 34 and outputs the image (audio) data to the whiteboard unit 20.

The whiteboard unit 20 renders content data, which is image (audio) data, using the renderer function of the whiteboard unit 20, thereby generating pieces of frame data as still image (audio) data. As illustrated in FIG. 5, the renderer is also a layout engine for laying out the plurality of types of contents A, p1, p2, E1, and E2.

Upon acquiring stroke data generated by the whiteboard control unit 22, the whiteboard unit 20 stores the stroke data in the data management unit 120. At this time, the whiteboard unit 20 stores the stroke data in the PDF (portable document format) format, for example. The whiteboard unit 20 renders the acquired stroke data, thereby generating frame data as still image (audio) data. At this time, if the whiteboard unit 20 has already-acquired content data, the whiteboard unit 20 outputs the frame data in a layout where the stroke data, which is operation data, is combined with the content data.

If the operation performed by a user is a page command (command to add a page), the whiteboard unit 20 stores the acquired page in the data management unit 120. If the operation performed by a user is an image command (command to add an image), the whiteboard unit 20 stores the acquired image(s) in the data management unit 120.

The transmission FIFO 24 is a buffer for storing therein pieces of frame data as still image (audio) data generated by the whiteboard unit 20.

The time management unit 25 manages time T unique to the distribution control apparatus 2.

The time acquisition unit 26 performs time adjustment in cooperation with a time control unit 56, which is described later, of the communication terminal 5. More specifically, the time acquisition unit 26 acquires time information (T) representing time T in the distribution control apparatus 2 from the time management unit 25, receives time information (t) representing time t in the communication terminal 5 from the time control unit 56, which is described later, via the transceiving unit 31 and a transceiving unit 51, and transmits the time information (t) and the time information (T) to the time control unit 56.

The channel-adaptive-control unit 27 calculates, based on transmission-delay time information (D), playback delay time U and calculates operating conditions, such as frame rate and data resolution, of a converting unit 10 in the encoder bridge unit 30. The playback delay time U is time, for which playback of data is delayed, resulting from data buffering before playback. Accordingly, the channel-adaptive-control unit 27 changes operations of the encoder bridge unit 30 depending on the transmission-delay time information (D) and data size (which may be the number of bits or the number of bytes). The transmission-delay time information (D) indicates frequency distribution information constructed from a plurality of pieces of transmission delay time D1 acquired by a delay-information acquisition unit 57 of the communication terminal 5 from a playback control unit 53. Each piece of the transmission delay time D1 is the time lag between when video (audio) data is transmitted from the distribution control apparatus 2 and when the video (audio) data is received by the communication terminal 5.

Figure 8:
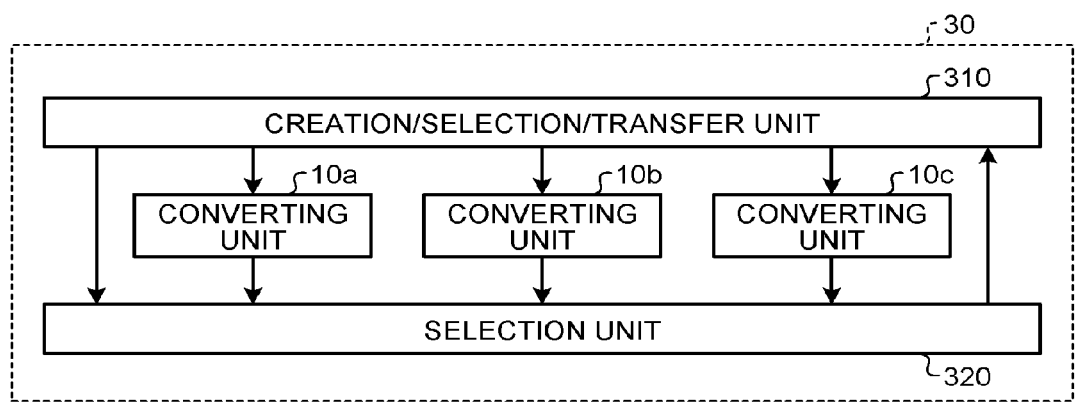
FIG. 8 is a detailed diagram of an encoder bridge unit.
Figure 9:
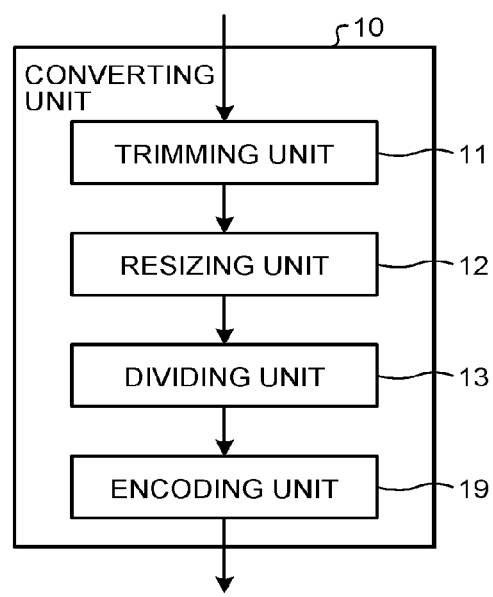
FIG. 9 is a functional block diagram illustrating functions of a converting unit.

The encoder bridge unit 30 outputs pieces of frame data as still image (audio) data generated by the whiteboard unit 20 to the converting unit 10 (see FIG. 8) in the encoder bridge unit 30. Upon receiving the data, the converting unit 10 performs various processing based on the operating conditions calculated by the channel-adaptive-control unit 27. The encoder bridge unit 30 is described in more detail below with reference to FIGS. 8 and 9. FIG. 8 is a detailed diagram of the encoder bridge unit. FIG. 9 is a functional block diagram illustrating functions of the converting unit.

As illustrated in FIG. 8, the encoder bridge unit 30 includes a creation/selection/transfer unit 310, a selection unit 320, and a plurality of converting units 10 (10*a*, 10*b*, and 10*c*). The converting units 10 are interposed between the creation/selection/transfer unit 310 and the selection unit 320. Although the number of the converting units is three in FIG. 8, the number can be any number. Hereinafter, the term "converting unit 10" is used to denote any one of the converting units.

The converting unit 10 converts the data format of pieces of frame data as still image (audio) data generated by the whiteboard unit 20 into a data format of H.264 or the like, that allows distribution of the data to the communication terminal(s) 5 via the communication network 9. For this purpose, as illustrated in FIG. 9, the converting unit 10 includes a trimming unit 11, a resizing unit 12, a dividing unit 13, and the encoding unit 19, thereby performing a variety of processing on the frame data. The trimming unit 11, the resizing unit 12, and the dividing unit 13 do not perform any processing when the frame data is audio data.

The trimming unit 11, which is one of the above-described units, performs cutting out only a part(s) of a still image. The resizing unit 12 changes an enlarging/reducing scale of the still image. The dividing unit 13 divides the still image as illustrated in FIG. 4.

The encoding unit 19 encodes the pieces of frame data as still image (audio) data generated by the whiteboard unit 20, thereby converting them into video (audio) data that can be distributed to the communication terminals 5 via the communication network 9. If the video is not in motion (when there is no inter-frame update (change)), a skip frame (may be sometimes referred to as frame skip) is thereafter inserted until the video moves, so as to save a bandwidth.

When audio data is generated together with still image data by rendering, both pieces of data are encoded, and when only audio data is generated, only encoding is performed to compress data without trimming, resizing, and dividing.

The creation/selection/transfer unit 310 creates a new converting unit 10, selects pieces of frame data as still image (audio) data to be fed to a converting unit 10 that is already generated, and transfers the pieces of frame data to the converting unit 10. In the creation, the creation/selection/transfer unit 310 creates a converting unit 10 capable of conversion according to the capability of the communication terminal 5 to play back video (audio) data. In the selection, the creation/selection/transfer unit 310 selects a converting unit 10 that is already created. For example, in starting distribution to the communication terminal 5*b* in addition to distribution to the communication terminal 5*a*, the same video (audio) data as video (audio) data being distributed to the communication terminal 5*a* may be distributed to the communication terminal 5*b*. In such a case, if the communication terminal 5*b* has the same level of capability as the capability of the communication terminal 5*a* to play back video (audio) data, the creation/selection/transfer unit 310 uses the converting unit 10*a* that is already created for the communication terminal 5*a*, without creating a new converting unit 10*b* for the communication terminal 5*b*. In the transfer, the creation/selection/transfer unit 310 transfers the pieces of frame data stored in the transmission FIFO 24 to the converting unit 10.

The selection unit 320 selects a desired one from the converting units 10 that are already created. The selection made by the creation/selection/transfer unit 310 and the selection unit 320 allows distribution in various patterns as illustrated in FIG. 5.

Referring back to FIG. 7, the transceiving unit 31 transmits and receives various data, requests, and the like to and from the communication terminals 5. The transceiving unit 31 transmits various data, requests, and the like to the communication terminals 5 via the communication network 9, thereby allowing the distribution control apparatus 2 to distribute the various data, requests, and the like to the communication terminals 5.

For example, in a login process of the communication terminal 5, the transceiving unit 31 transmits authentication screen data for prompting a user to submit a login request to the transceiving unit 51 of the communication terminal 5. Furthermore, the transceiving unit 31 receives, from the communication terminal 5, operation data representing an operation performed by a user. Furthermore, the transceiving unit 31 transmits, to the communication terminal 5, frame data (converted video data) obtained by the converting unit 10 by converting pieces of frame data as still image (audio) data into a data format that allows distribution to the communication terminal 5 via the communication network 9. The transceiving unit 31 corresponds to "receiving unit" and "transmitting unit".

Furthermore, the transceiving unit 31 performs data transmission and data reception to and from user applications of the communication terminal 5 and device applications of the communication terminal 5 by a protocol unique to the distribution system 1 through a hypertext transfer protocol over secure socket layer (HTTPS) server. This specific protocol is an HTTPS-based application layer protocol for transmitting and receiving data in real time without being interrupted between the distribution control apparatus 2 and the communication terminals. The transceiving unit 31 further performs transmission response control, real-time data generation, command transmission, reception response control, received-data analysis, and gesture conversion.

The transmission response control is a process to manage an HTTPS session for downloading requested from the communication terminal 5 in order to transmit data from the distribution control apparatus 2 to the communication terminal 5. The response of the HTTPS session for downloading does not end immediately and holds for a certain period of time (one to several minutes). The transceiving unit 31 dynamically writes data to be transmitted to the communication terminal 5 in the body part of the response. In order to eliminate costs for reconnection, another request is allowed to reach from the communication terminal before the previous session ends. By putting the transceiving unit 31 on standby until the previous request is completed, overhead can be eliminated even when reconnection is performed.

The real-time data generation is a process to give a unique header to the data of compressed video (and compressed audio) generated by the encoding unit 19 in FIG. 9 and write the data into the body part of HTTPS.

The command transmission is a process to generate command data to be transmitted to the communication terminal 5 and write the command data into the body part of HTTPS directed to the communication terminal 5.

The reception response control is a process to manage an HTTPS session requested from the communication terminal 5 so that the distribution control apparatus 2 can receive data from the communication terminal 5. The response of this HTTPS session does not end immediately and is held for a certain period of time (one to several minutes). The communication terminal 5 dynamically writes data to be transmitted to the transceiving unit 31 of the distribution control apparatus 2 into the body part of the request.

The received-data analysis is a process to analyze the data transmitted from the communication terminal 5 by type and deliver the data to a necessary process.

The gesture conversion is a process to convert a gesture event entered by a user to the communication terminal 5f as the electronic whiteboard, with an electronic pen or in handwriting into data in a format receivable by the whiteboard unit 20.

The reception FIFO 34 is a buffer for storing therein video (audio) data decoded by the decoding unit 40.

The recognition unit 35 performs processing on image (audio) data received from the communication terminal 5. More specifically, for example, the recognition unit 35 recognizes the face, age, sex, and the like of a person or animal based on an image(s) captured with a camera 62, in a digital signage application. In a workplace, the recognition unit 35 performs name tagging by face recognition and replacement of a background image based on the image(s) captured with the camera 62. The recognition unit 35 stores recognition information indicating the recognized details in the storage unit 2000. The recognition unit 35 achieves speeding up by performing processing with a recognition expansion board.

The delay-information acquisition unit 37a is used in uplink channel adaptive control and corresponds to the delay-information acquisition unit 57 for the communication terminal 5 for use in downlink channel adaptive control. More specifically, the delay-information acquisition unit 37a acquires transmission-delay time information (d1) indicating transmission delay time d1 from the decoding unit 40 and holds the transmission-delay time information (d1) for a certain period of time. When a plurality of pieces of the transmission-delay time information (d1) are acquired, the delay-information acquisition unit 37a outputs, to the channel-adaptive-control unit 37b, transmission-delay time information (d) indicating frequency distribution information based on a plurality of pieces of the transmission delay time d1 Each piece of the transmission-delay time information (d1) indicates time from the point when video (audio) data is transmitted from the communication terminal 5 to the point when the video (audio) data is received by the distribution control apparatus 2.

The channel-adaptive-control unit 37b is used in the uplink channel adaptive control and corresponds to the channel-adaptive-control unit 27 for use in the downlink channel adaptive control. More specifically, the channel-adaptive-control unit 37b calculates the operating conditions of the encoding unit 60 for the communication terminal 5 based on the transmission-delay time information (d). The channel-adaptive-control unit 37b transmits a channel-adaptive-control signal indicating operating conditions such as a frame rate and data resolution to the encoding unit 60 of the communication terminal 5 via the transceiving unit 31 and the transceiving unit 51.

The decoding unit 40 decodes the video (audio) data transmitted from the communication terminal 5. Furthermore, the decoding unit 40 outputs the transmission-delay time information (d1) indicating the transmission delay time d1 to the delay-information acquisition unit 37a.

Functional Configuration of Communication Terminal

Figure 10:
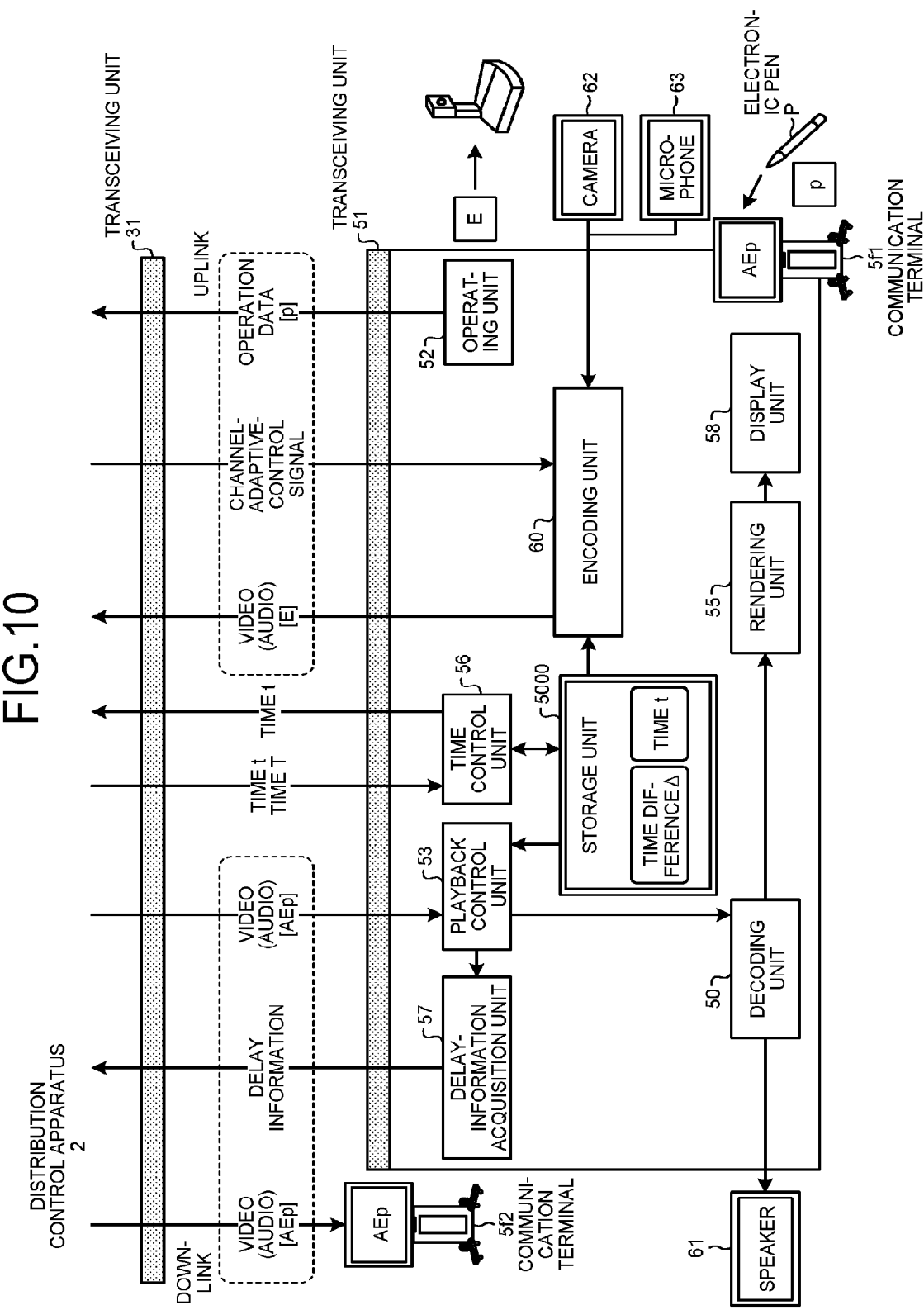
FIG. 10 is a functional block diagram illustrating functions of the communication terminals according to the embodiment.

The functional configuration of the communication terminal 5 is described below with reference to FIG. 10. FIG. 10 is a functional block diagram illustrating functions of the communication terminal according to the embodiment. The communication terminal 5 is a terminal serving as an interface for a user to perform a login to the distribution system 1, start and stop the distribution of video (audio) data, and the like.

As illustrated in FIG. 10, the communication terminal 5 has functional components illustrated in FIG. 10 implemented by the hardware configuration including the CPU 201 and the programs illustrated in FIG. 6. In a case where the communication terminal 5 becomes communicable with the other terminals and systems via the communication network 9 by the insertion of the dongle, the communication terminal 5 has the functional components illustrated in FIG. 10 implemented by the hardware configuration and the programs illustrated in FIG. 6.

More specifically, the communication terminal 5 includes a decoding unit 50, the transceiving unit 51, an operating unit 52, the playback control unit 53, a rendering unit 55, the time control unit 56, the delay-information acquisition unit 57, a display unit 58, and the encoding unit 60. The communication terminal 5 further includes a storage unit 5000 implemented by the RAM 203 illustrated in FIG. 6. The storage unit 5000 stores therein time difference information ($\Delta$) indicating a time difference $\Delta$, which is described later, and time information (t) indicating time t in the communication terminal 5.

The decoding unit 50 decodes video (audio) data distributed from the distribution control apparatus 2 and output from the playback control unit 53. If the decoded video (audio) data contains voice, the voice is output through a speaker 61.

The transceiving unit 51 transmits and receives various data, requests, and the like to and from the transceiving unit 31 of the distribution control apparatus 2 and to and from the terminal management apparatus 7. For example, in the login process of the communication terminal 5, the transceiving unit 51 submits a login request to the terminal management apparatus 7 in response to the startup of the communication terminal 5 by the operating unit 52.

The operating unit 52 performs a process to receive operations input by a user, such as input and selection with a power switch, a keyboard, a mouse, the electronic pen P, and the like, and transmits them as operation data to the whiteboard control unit 22 of the distribution control apparatus 2.

The playback control unit 53 buffers video (audio) data (a packet of real-time data) received from the transceiving unit 51 and outputs the video (audio) data to the decoding unit 50 with the playback delay time U taken into account. Furthermore, the playback control unit 53 calculates the transmission-delay time information (D1) indicating transmission delay time D1 and outputs the transmission-delay time information (D1) to the delay-information acquisition unit 57.

The rendering unit 55 renders the data decoded by the decoding unit 50.

The time control unit 56 performs the time adjustment in cooperation with the time acquisition unit 26 of the distribution control apparatus 2. More specifically, the time control unit 56 acquires time information (t) indicating time t in the communication terminal 5 from the storage unit 5000. Furthermore, the time control unit 56 issues a request for time information (T) indicating time T in the distribution control apparatus 2 to the time acquisition unit 26 of the distribution control apparatus 2 via the transceiving unit 51 and the transceiving unit 31. At this time, the time information (t) is transmitted concurrently with the request for the time information (T).

The delay-information acquisition unit 57 acquires the transmission-delay time information (D1) indicating transmission delay time D1 from the playback control unit 53 and holds the transmission-delay time information (D1) for a certain period of time. When a plurality of pieces of the transmission-delay time information (d1) are acquired, the delay-information acquisition unit 57 outputs transmission-delay time information (D) indicating frequency distribution information based on a plurality of pieces of the transmission delay time D1 to the channel-adaptive-control unit 27 via the transceiving unit 51 and the transceiving unit 31. The transmission-delay time information (D) is transmitted for every 100 frames, for example.

The display unit 58 plays back the data rendered by the rendering unit 55.

The encoding unit 60 transmits video (audio) data E that is acquired from a built-in microphone 213 or the camera 62 and a microphone 63 that are externally attached, and is encoded; time information (t0) that is acquired from the storage unit 5000 and indicates current time t0 in the communication terminal 5; and the time difference information (Δ) that is acquired from the storage unit 5000 and indicates the time difference Δ, to the decoding unit 40 of the distribution control apparatus 2 via the transceiving unit 51 and the transceiving unit 31. The time difference Δ indicates a difference between the time managed independently by the distribution control apparatus 2 and the time managed independently by the communication terminal 5.

The encoding unit 60 changes the operating conditions of the encoding unit 60 based on the operating conditions indicated by the channel-adaptive-control signal received from the channel-adaptive-control unit 37b. Furthermore, the encoding unit 60, in accordance with the new (changed) operating conditions, transmits the video (audio) data E that is acquired from the camera 62 and the microphone 63 and is encoded; the time information (t0) that is acquired from the storage unit 5000 and indicates the current time t0 in the communication terminal 5; and the time difference information (Δ) that is acquired from the storage unit 5000 and indicates the time difference Δ, to the decoding unit 40 of the distribution control apparatus 2 via the transceiving unit 51 and the transceiving unit 31.

The built-in microphone 213, the externally attached camera 62 and microphone 63, and the like are examples of an input unit and are devices that need encoding and decoding. The input unit may be output touch data and smell data in addition to video (audio) data. Examples of the input unit include various sensors such as a temperature sensor, a direction sensor, and an acceleration sensor, and the like.

Operations and Processes

Operations and processes of the present embodiment are described below with reference to FIGS. 11 to 14. These processes are performed by the CPUs of the distribution control apparatus 2, the communication terminals 5, and the terminal management apparatus 7 in accordance with the respective programs stored therein.

Basic Distribution Process

Figure 11:
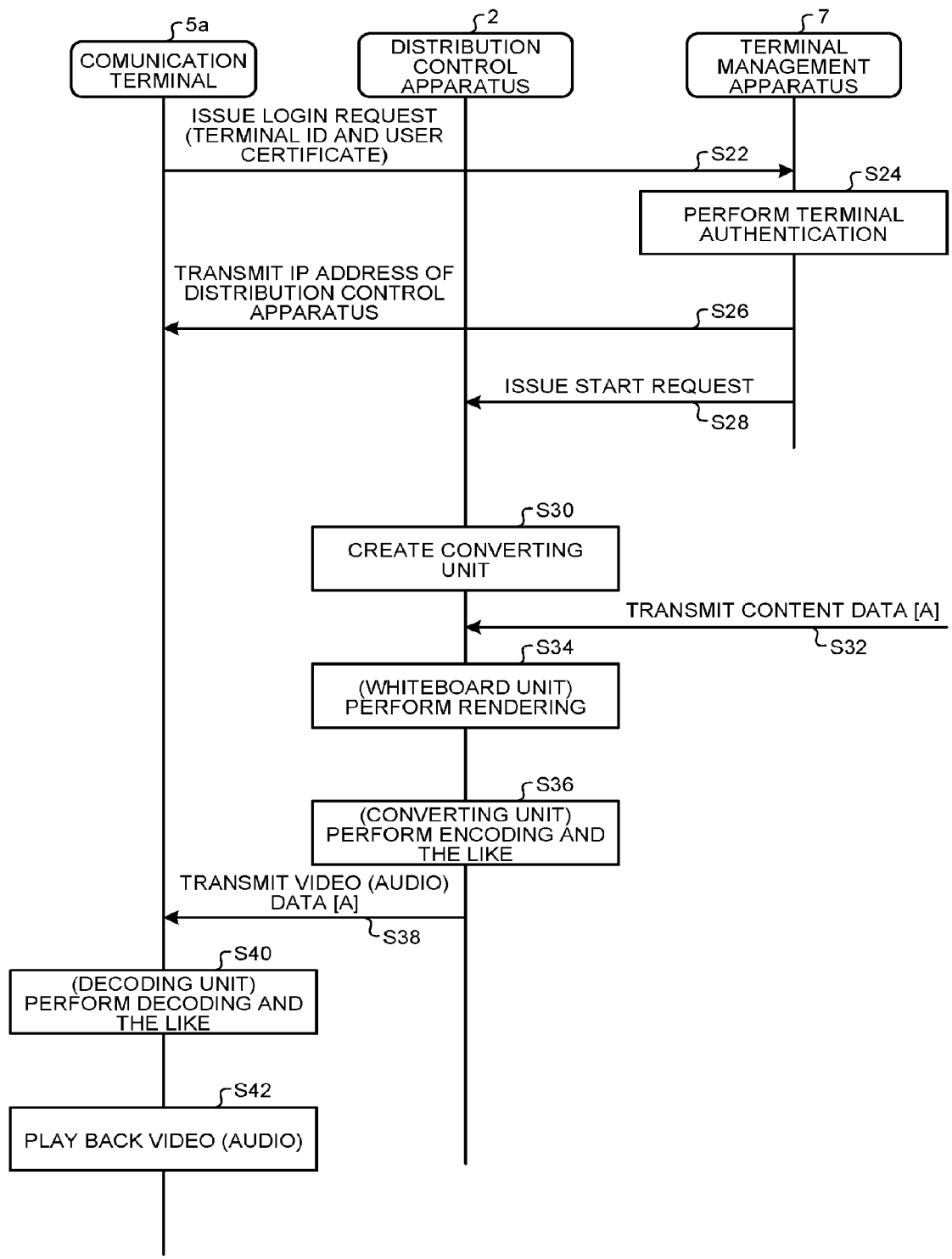
FIG. 11 is a sequence diagram illustrating a basic distribution process performed by the distribution control apparatus according to the embodiment.

A specific distribution process according to the basic distribution method illustrated in FIG. 2 is described below with reference to FIG. 11. FIG. 11 is a sequence diagram illustrating the basic distribution process performed by the distribution control apparatus according to the embodiment. Although described herein is a case where a login request is issued through the communication terminal 5a, a login may be performed through the communication terminals 5 other than the communication terminal 5a.

As illustrated in FIG. 11, when a user turns on the power to the communication terminal 5a, the transceiving unit 51 of the communication terminal 5a issues a login request to the terminal management apparatus 7 (S22). The terminal management apparatus 7 receives the login request and performs authentication of the communication terminal 5a (step S24). The following description is on an assumption that the communication terminal 5a is authenticated as a valid terminal in the distribution system 1.

The terminal management apparatus 7 transmits the IP address of the distribution control apparatus 2 to the transceiving unit 51 of the communication terminal 5a (step S26). The IP address of the distribution control apparatus 2 is acquired by the terminal management apparatus 7 from the distribution control apparatus 2 and is stored in advance.

Thereafter, the terminal management apparatus 7 issues a request for starting a distribution process to the transceiving unit 21 of the distribution control apparatus 2 (step S28). The transceiving unit 21 receives the request for starting the distribution process. The whiteboard control unit 22 controls the whiteboard unit 20 based on the start request received by the transceiving unit 21.

Thereafter, the creation/selection/transfer unit 310 of the encoder bridge unit 30 creates the converting unit 10 according to playback capability (e.g., resolution of a display) of the communication terminal 5a and the type of content (step S30). Thereafter, the transceiving unit 21 acquires the content data A from a desired communication terminal as instructed by the whiteboard unit 20 (step S32).

The whiteboard unit 20 renders the content data A acquired by the transceiving unit 21, thereby generating pieces of frame data as still image (audio) data and outputs the pieces of frame data to the transmission FIFO 24 (step S34). The converting unit 10 encodes the pieces of frame data stored in the transmission FIFO 24, thereby converting them into the video (audio) data A to be distributed to the communication terminal 5a (step S36).

Thereafter, the transceiving unit 31 transmits the video (audio) data A to the transceiving unit 51 of the communication terminal 5a (step S38). The transceiving unit 51 of the communication terminal 5a receives the video (audio) data A and outputs the video (audio) data A to the playback control unit 53.

In the communication terminal 5a, the decoding unit 50 acquires the video (audio) data A from the playback control unit 53 and decodes the video (audio) data A (step S40). Thereafter, the speaker 61 plays back audio in accordance with the decoded audio data A, while the display unit 58 plays back a video based on the video data A acquired from the decoding unit 50 and rendered by the rendering unit 55 (step S42).

Composite Distribution Process Using a Plurality of Communication Terminals

Figure 12:
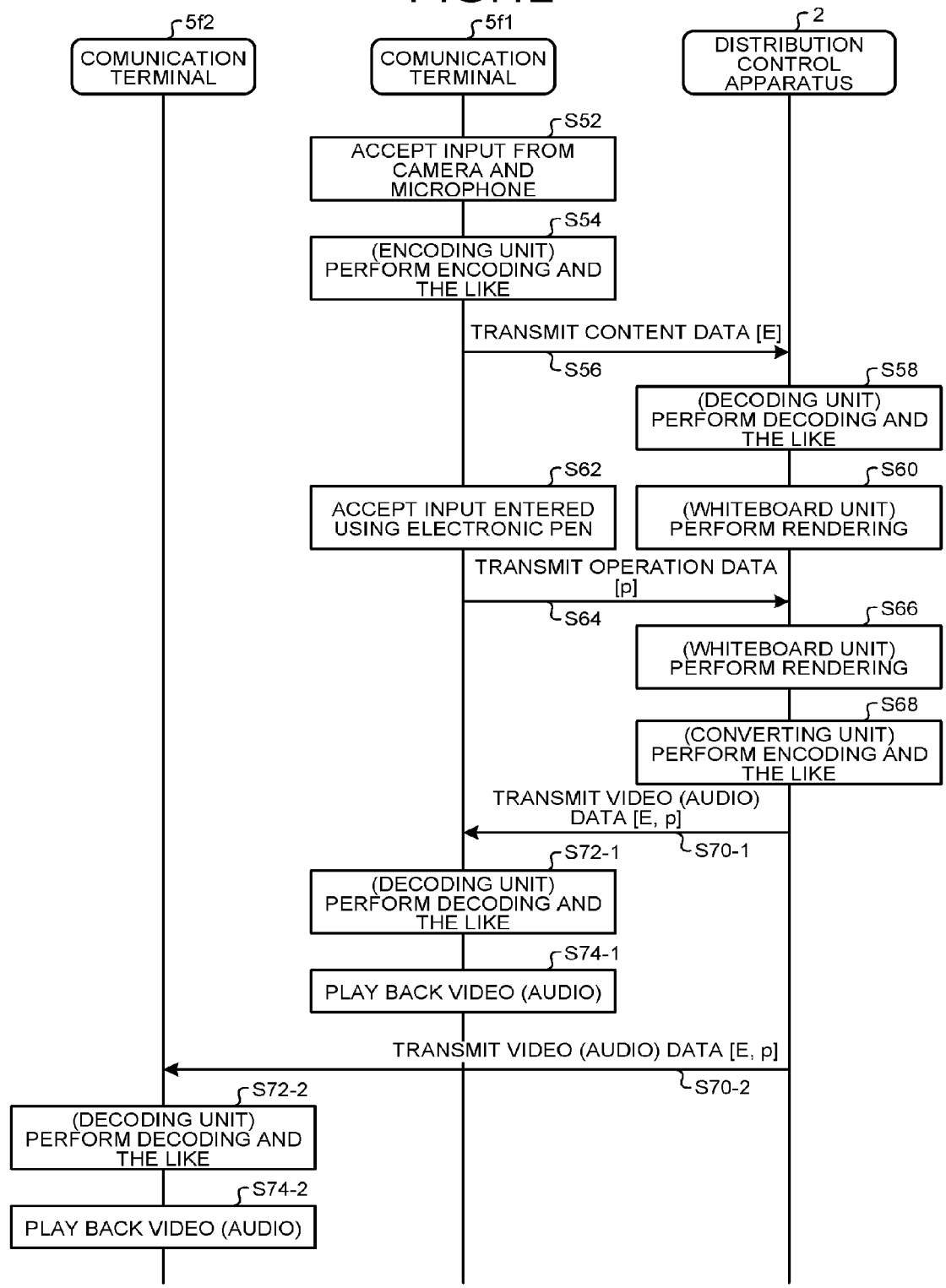
FIG. 12 is a sequence diagram illustrating a distribution process via the distribution control apparatus using the plurality of communication terminals according to the embodiment.

A communication process via the distribution control apparatus using the plurality of communication terminals is described below with reference to FIG. 12. FIG. 12 is a sequence diagram illustrating a distribution process via the distribution control apparatus according to the embodiment using the plurality of communication terminals. Described here is a specific process for the plurality of communication terminals 5 in the pattern illustrated in FIG. 5 is described below. FIG. 12 illustrates processing to be performed after a login process, issuance of a start request, and generation of a converting unit have been performed as in steps S22 to S30 in FIG. 11.

When the encoding unit 60 of the communication terminal 5/1 receives an input of content data as video (audio) data E from the camera 62 and the microphone 63 (step S52), the encoding unit 60 encodes the content data E (step S54). The transceiving unit 51 transmits the content data E encoded by the encoding unit 60 to the transceiving unit 31 of the distribution control apparatus 2 (step S56). The transceiving unit 31 of the distribution control apparatus 2 receives the content data E.

Thereafter, the decoding unit 40 of the distribution control apparatus 2 decodes the content data E received by the transceiving unit 31 and outputs the decoded content data E to the reception FIFO 34 (step S58). The whiteboard unit 20 renders the content data E stored in the reception FIFO 34, thereby generating the frame data E as still image (audio) data and outputs the frame data E to the transmission FIFO 24 (step S60). In this case, if the whiteboard unit 20 has already-acquired content data, the whiteboard unit 20 outputs the data in a layout in which the content data E is combined with the already-acquired content data.

In addition, when the operating unit 52 of the communication terminal 5/1 receives an input of a stroke operation with the electronic pen P1 (step S62), the transceiving unit 51 transmits operation data p indicating the details of the stroke operation received by the operating unit 52 to the transceiving unit 31 of the distribution control apparatus 2 (step S64). The transceiving unit 31 of the distribution control apparatus 2 receives the operation data p. The whiteboard control unit 22 outputs the operation data p received by the transceiving unit 31 to the whiteboard unit 20.

The whiteboard unit 20 renders the operation data p, thereby generating frame data p as still image (audio) data and outputs the frame data p to the transmission FIFO 24 (step S66). In this case, the whiteboard unit 20 outputs the data in a layout in which the operation data p is combined with the already-acquired content data E.

Thereafter, the converting unit 10 encodes pieces of frame data (E, p) as still image (audio) data stored in the transmission FIFO 24, thereby converting them into video (audio) data (E, p) to be distributed to the communication terminal 5a (step S68).

Thereafter, the transceiving unit 31 acquires the encoded video (audio) data (E, p) from the encoder bridge unit 30 including the converting unit 10 and transmits the video (audio) data (E, p) to the transceiving unit 51 of the communication terminal 5/1 (step S70-1). The transceiving unit 51 of the communication terminal 5/1 receives the video (audio) data (E, p). The playback control unit 53 of the communication terminal 5/1 acquires the video (audio) data (E, p) from the transceiving unit 51.

In the communication terminal 5/1, the decoding unit 50 acquires the video (audio) data (E, p) from the playback control unit 53 and decodes the video (audio) data (E, p) (step S72-1). Thereafter, the speaker 61 plays back audio in accordance with the decoded audio data E, while the display unit 58 plays back a video in accordance with the decoded video data (E, p) acquired from the decoding unit 50 and rendered by the rendering unit 55 (step S74-1).

For the communication terminal 5/2, as is the case with step S70-1, the transceiving unit 31 acquires the encoded video (audio) data (E, p) from the encoder bridge unit 30 and transmits the video (audio) data (E, p) to the transceiving unit 51 of the communication terminal 5/2 (step S70-2). The playback control unit 53 of the communication terminal 5/2 acquires the video (audio) data (E, p).

In the communication terminal 5/2, the decoding unit 50 acquires the video (audio) data (E, p) from the playback control unit 53 and decodes the video (audio) data (E, p) (step S72-2). Thereafter, the speaker 61 plays back audio in accordance with the decoded audio data E, while the display unit 58 plays back a video in accordance with the decoded video data (E, p) acquired from the decoding unit 50 and rendered by the rendering unit 55 (step S74-2).

Hence, the same video (audio) as the video (audio) output from the communication terminal 5/1 is output also from the communication terminal 5/2.

Figure 13:
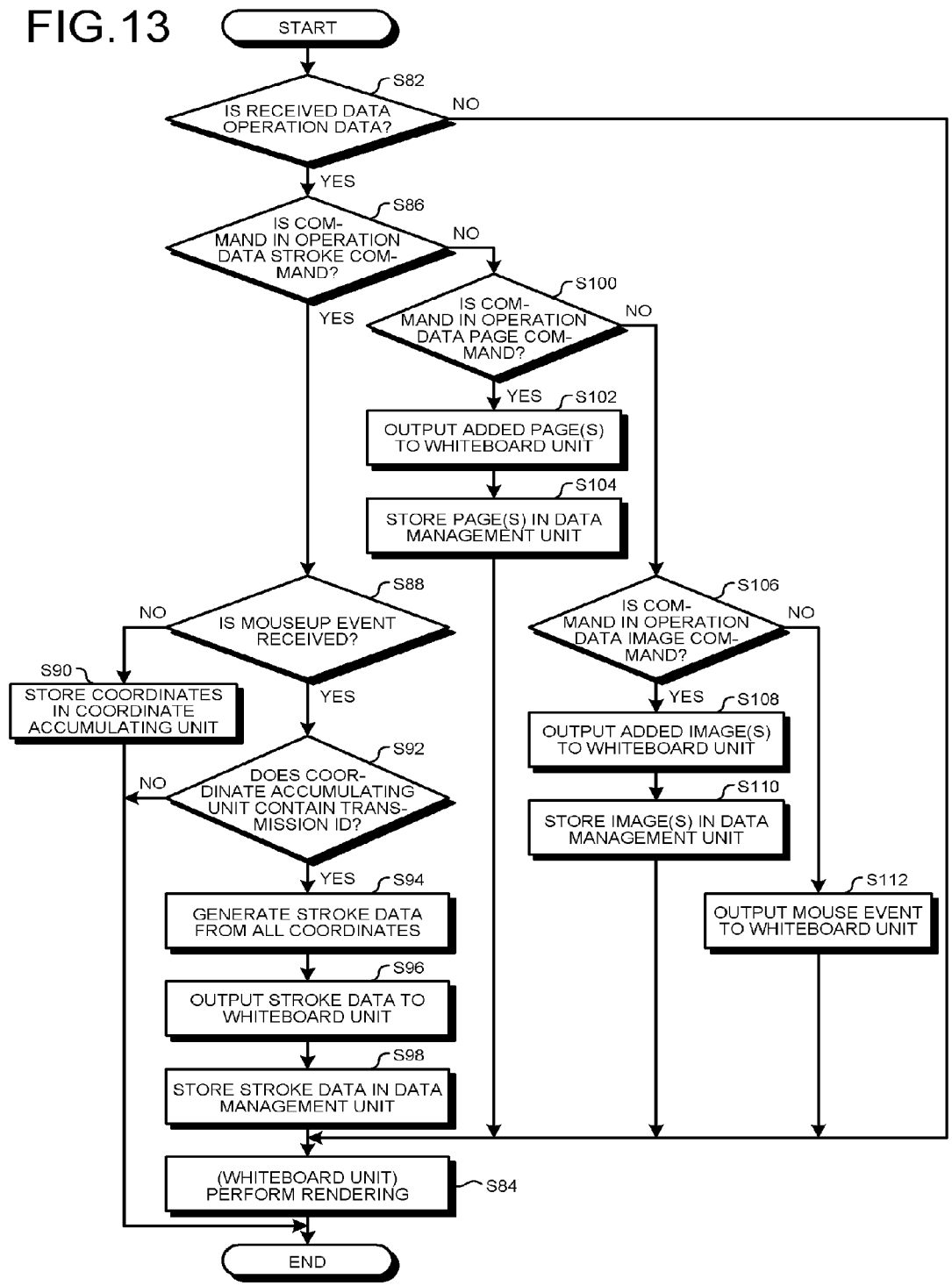
FIG. 13 is a process flow diagram of a rendering process performed by an interactive whiteboard unit of the distribution control apparatus according to the present embodiment.

The rendering process performed by the whiteboard unit 20 at step S66 in FIG. 12 is described in detail below. FIG. 13 is a process flow diagram of the rendering process performed by the whiteboard unit of the distribution control apparatus according to the present embodiment.

The whiteboard control unit 22 determines whether data received by the transceiving unit 31 is the operation data p (step S82). If the received data is not operation data (No at step S82) or, put another way, the received data is the content data E, the whiteboard unit 20 renders the content data E (step S84). The process performed at step S84 is the rendering process at step S60 in FIG. 12.

If the received data is operation data (Yes at step S82), the whiteboard control unit 22 determines whether a command contained in the operation data is a stroke command (step S86). If the command contained in the operation data is a stroke command (Yes at step S86), the whiteboard control unit 22 determines whether a mouseup event is received (step S88).

If a mouseup event is not received (No at step S88), the whiteboard control unit 22 stores coordinates contained in the operation data and a transmission ID in the coordinate accumulating unit 122 (step S90). The transmission ID is an identification number given to operation data containing a stroke command when the operation data is received.

As illustrated in FIG. 14, the coordinate accumulating unit 122 may store therein meta stroke information such as color and thickness contained in the operation data. The coordinates may contain, in addition to an X coordinate and a Y coordinate, information about time and pressure. Hereinafter, it is assumed that the stroke data is made up of meta stroke information and coordinate columns.

If a mouseup event is received at step S88 (Yes at step S88), the whiteboard control unit 22 determines whether coordinates associated with the transmission ID are stored in the coordinate accumulating unit 122 (step S92). If coordinates associated with the transmission ID are not stored in the coordinate accumulating unit 122 (No at step S92), processing ends.

On the other hand, if coordinates associated with the transmission ID are stored in the coordinate accumulating unit 122 (Yes at step S92), the whiteboard control unit 22 retrieves all the coordinates stored in the coordinate accumulating unit 122 and generates stroke data representing a stroke(s) from the retrieved all coordinates (step S94). The whiteboard control unit 22 deletes the retrieved coordinates from the coordinate accumulating unit 122.

Thereafter, the whiteboard control unit 22 outputs the generated stroke data to the whiteboard unit 20 (step S96). The whiteboard unit 20 stores the acquired stroke data in the data management unit 120 (step S98). The whiteboard unit 20 renders the acquired stroke data (step S84).

If the command contained in the operation data is not a stroke command (No at step S86), the whiteboard control unit 22 determines whether the command contained in the operation data is a page command (step S100).

If the command contained in the operation data is a page command (Yes at step S100), the whiteboard control unit 22 outputs an added page to the whiteboard unit 20 (step S102). The whiteboard unit 20 stores the acquired page in the data management unit 120 (step S104) and performs rendering (step S84).

On the other hand, if the command contained in the operation data is not a page command (No at step S100), the whiteboard control unit 22 determines whether the command contained in the operation data is an image command (step S106).

If the command contained in the operation data is an image command (Yes at step S106), the whiteboard control unit 22 outputs an added image to the whiteboard unit 20 (step S108). The whiteboard unit 20 stores the acquired image in the data management unit 120 (step S110) and performs rendering (step S84).

On the other hand, if the command contained in the operation data is not an image command (No at step S106), the whiteboard control unit 22 outputs the operation data as a mouse event to the whiteboard unit 20 (step S112). The whiteboard unit 20 performs rendering (step S84). When storing data in the data management unit 120, the whiteboard unit 20 generates PDF data from all the pages and stores the PDF data in the data management unit 120 as backup data.

The time adjustment, the downlink channel adaptive control, the uplink channel adaptive control, a process for multi-display performed by the communication terminal 5, the distribution control apparatus 2, and the terminal management apparatus 7, and processes for generating various frame data are disclosed in detail in Japanese Laid-open Patent Publication No. 2014-200074 and therefore description thereabout is omitted.

As described above, the distribution control apparatus 2 according to the present embodiment stores a series of coordinates entered onto the display of the communication terminal 5 and generates stroke data representing a stroke drawn by a user from all the stored coordinates. After storing the generated stroke data, the distribution control apparatus 2 renders the acquired stroke data, thereby generating frame data as still image (audio) data. At this time, if the distribution control apparatus 2 has already-acquired content data, the distribution control apparatus 2 outputs the data in a layout in which the stroke data as operation data is combined with the content data. Frame data (video data) that is obtained by converting the frame data as still image (audio) data into a data format that allows distribution to the communication terminal 5 is transmitted to the communication terminal 5. The frame data (video data) is played back on the display of the communication terminal 5. In this manner, by storing an operation input entered by a user during distribution of frame data, it becomes possible to display the operation input, such as a stroke, even after distribution of the frame data ends. As a result, convenience is increased.

Program instructions to be executed by the distribution control apparatus 2 of the present embodiment are provided as being recorded in a non-transitory computer-readable recording medium such as a CD-ROM, an FD (flexible disk), a CD-R, or a DVD (digital versatile disk) as an installable file(s) or an executable file(s).

The program instructions to be executed by the distribution control apparatus 2 of the present embodiment may be configured to be stored in a computer connected to a network such as the Internet and provided by being downloaded via the network. The program instructions to be executed by the distribution control apparatus 2 of the present embodiment may be configured to be provided or distributed via a network such as the Internet. The program instructions to be executed by the distribution control apparatus 2 of the present embodiment may be configured to be provided as being stored in a ROM or the like in advance.

The program instructions to be executed by the distribution control apparatus 2 of the present embodiment are configured in modules including the above-described units (the transceiving unit 21, the whiteboard control unit 22, the transmission FIFO 24, the time management unit 25, the time acquisition unit 26, the channel-adaptive-control unit 27, the encoder bridge unit 30, the transceiving unit 31, the reception FIFO 34, the recognition unit 35, the delay-information acquisition unit 37a, the channel-adaptive-control unit 37b, and the decoding unit 40). From a perspective of actual hardware, a CPU (processor) reads out the program instructions from the recording medium and executes the program instructions to load the units into a main storage device, thereby generating the units on the main storage device. Furthermore, a part or all of the functions of the above-described units may be implemented by a dedicated hardware circuit, for example.

According to an aspect of the present invention, because user's operation input can be displayed even after video distribution ends, convenience can be increased.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A distribution control apparatus connected to a communication terminal via a network, the distribution control apparatus comprising:
- a receiver configured to receive, from the communication terminal, operation data representing an operation performed by a user;
- processing circuitry configured to
  - when the operation is a stroke command, determine whether the operation is a mouse up event, and when the operation is not a mouse up event, store coordinates contained in the operation data together with a transmission identifier in a first memory, and when the operation is a mouse up event, retrieve all coordinates stored in the first memory and generate stroke data representing a stroke from the stored coordinates, and
  - store the generated stroke data in a second memory and generate video data by rendering the stroke data; and
- a transmitter configured to transmit, to the communication terminal, converted video data that is obtained by converting the generated video data into a data format that allows distribution.

2. The distribution control apparatus according to claim 1, wherein when the operation is a command to add a page, the processing circuitry stores the added page in the second memory.

3. The distribution control apparatus according to claim 1, wherein when the operation is a command to add an image, the processing circuitry stores the added image in the second memory.

4. The distribution control apparatus according to claim 1, wherein the processing circuitry stores the stroke data in a portable document format.

5. A distribution control method to be performed by a distribution control apparatus connected to a communication terminal via a network, the distribution control method comprising:
- receiving, from the communication terminal, operation data representing an operation performed by a user;
- when the operation is a stroke command, determining whether the operation is a mouse up event, and when the operation is not a mouse up event, storing coordinates contained in the operation data together with a transmission identifier in a first memory, and when the operation is a mouse up event, retrieving all coordinates stored in the first memory;
- generating stroke data representing a stroke from the stored coordinates;
- storing the generated stroke data in a second memory;
- generating video data by rendering the stroke data; and
- transmitting, to the communication terminal, converted video data that is obtained by converting the generated video data into a data format that allows distribution.

6. A computer program product comprising a non-transitory computer-readable recording medium including programmed instructions that, when executed by a computer, cause the computer to execute:
- receiving, from a communication terminal connected to the computer, operation data representing an operation performed by a user;
- when the operation is a stroke command, determining whether the operation is a mouse up event, and when the operation is not a mouse up event, storing coordinates contained in the operation data together with a transmission identifier in a first memory, and when the operation is a mouse up event, retrieving all coordinates stored in the first memory;
- generating stroke data representing a stroke from the stored coordinates;
- storing the generated stroke data in a second memory;
- generating video data by rendering the stroke data; and
- transmitting, to the communication terminal, converted video data that is obtained by converting the generated video data into a data format that allows distribution.

7. The distribution control apparatus of claim 1, wherein the processing circuitry is further configured to, when the operation is a mouse up event, determine whether coordinates associated with the transmission identifier are stored in the first memory, and if so, generate the stroke data from the stored coordinates.

* * * * *